United States Patent [19]

Mundlos et al.

[11] 4,009,162
[45] Feb. 22, 1977

[54] BASIC OXAZINE DYESTUFFS

[75] Inventors: Eberhard Mundlos, Heusenstamm; Reinhard Mohr; Luis Herz, both of Offenbach, Main, all of Germany

[73] Assignee: Hoechst Aktiengesellschaft, Frankfurt am Main, Germany

[22] Filed: Mar. 19, 1975

[21] Appl. No.: 560,095

Related U.S. Application Data

[63] Continuation of Ser. No. 415,683, Nov. 14, 1973, abandoned, which is a continuation of Ser. No. 153,805, June 16, 1971, abandoned.

[30] Foreign Application Priority Data

June 18, 1970  Germany ............ 2030028

[52] U.S. Cl. ............ 260/245; 260/244 R; 260/246 R
[51] Int. Cl.² ............ C07D 265/00; C07D 265/12; C07D 273/00; C07D 295/00
[58] Field of Search ............ 260/242, 244, 246, 245

[56] References Cited
UNITED STATES PATENTS

| 2,376,283 | 5/1945 | Short et al. ............ 260/244 |
| 3,629,248 | 12/1971 | Shäfer et al. ............ 260/242 |
| 3,681,347 | 8/1972 | Herz et al. ............ 260/244 |

FOREIGN PATENTS OR APPLICATIONS

| 124,431 | 9/1967 | Czechoslovakia ............ 260/244 |

Primary Examiner—Albert T. Meyers
Assistant Examiner—D. W. Robinson
Attorney, Agent, or Firm—Connolly and Hutz

[57] ABSTRACT

New valuable basic oxazine dyestuffs of the formula

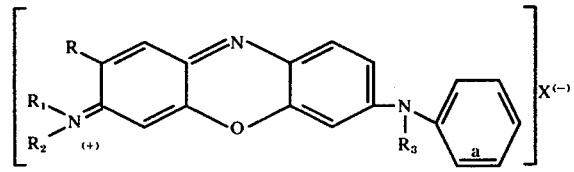

in which R is hydrogen or lower alkyl, $R_1$ is hydrogen or lower alkyl substituted by halogen, lower alkoxy, cyano or hydroxy, $R_2$ and $R_3$ each is hydrogen or lower alkyl or lower alkyl substituted by halogen, lower alkoxy, cyano or hydroxy, or $R_1$ and $R_2$ form together with the nitrogen atom the pyrrolidino, piperazino, piperidino or morpholino ring, and the phenyl nucleus a is substituted by lower alkyl, lower alkoxy, acetyl, cyano, halogen, phenoxy or trifluoromethyl, and $X^{(-)}$ is an anion has been found which are well suitable for the dyeing or printing of tanned cellulose fibers, silk, leather, or acetate rayon, synthetic polyamide fibers or acid-modified polyester and polyamide fibers and fibers containing polyacrylonitrile or polyvinylidene cyanide. The dyeings and prints obtained are bright and color-intensive and have good fastnesses to light and to wet processing.

1 Claim, No Drawings

BASIC OXAZINE DYESTUFFS

This application is a continuation of application Ser. No. 415,683 filed Nov. 14, 1973 now abandoned, which is a continuation of application Ser. No. 153,805 filed June 16, 1971 and now abandoned.

The present invention provides an improved process for the manufacture of basic oxazine dyestuffs.

It is known from Belgian Pat. No. 661,783 that the condensation of p-nitroso-diphenyl amine with m-amino-phenols yields basic oxazine dyestuffs which are suitable for the dyeing of polyacrylonitrile. According to that process, heavily contaminated dyestuffs are generally obtained so that a subsequent purification is absolutely necessary.

It has now been found that basic oxazine dyestuffs of the formula I

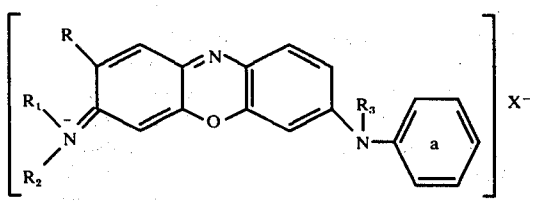
(I)

in which R stands for hydrogen or a lower alkyl group, $R_1$, $R_2$ and $R_3$ each stands for hydrogen or an optionally substituted lower alkyl group which may be substituted, for example, by halogen atoms or lower alkoxy, cyano or hydroxy groups, and $R_1$ and $R_2$ may form together with the N-atom a heterocyclic ring, and $X^-$ stands for an anion and the benzene nucleus $a$ may optionally contain non-ionic substituents, for example, halogen atoms, lower alkoxy, aryloxy, lower alkyl, trifluoromethyl, nitro, lower alkylsulfonyl, arylsulfonyl, arylamino, cyano or acyl groups or mono- or dialkylamino groups, the alkyl portion of which contains 1 to 5 carbon atoms, are obtained in a purer form by reacting, in an acid medium, a. a compound of the formula II

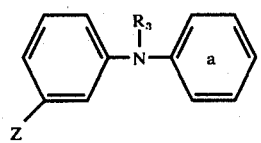
(II)

in which $R_3$ and $a$ are defined as above, and Z stands for a lower alkoxy or lower dialkylamino group, with a compound of the formula III

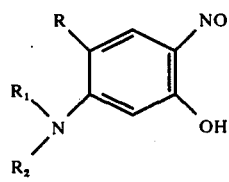
(III)

in which R, $R_1$ and $R_2$ are defined as above, or
b. a compound of the formula IV

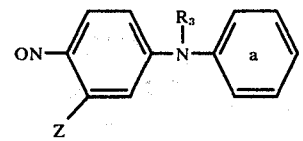
(IV)

in which $R_3$, Z and $a$ are defined as above, with a compound of the formula V

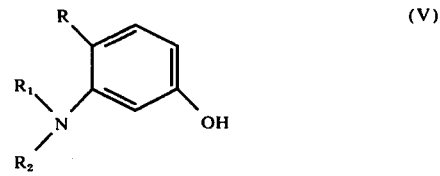
(V)

in which R, $R_1$ and $R_2$ are defined as above.

The present invention relates to a (1) process for the manufacture of basic oxazine dyestuffs of the general formula I

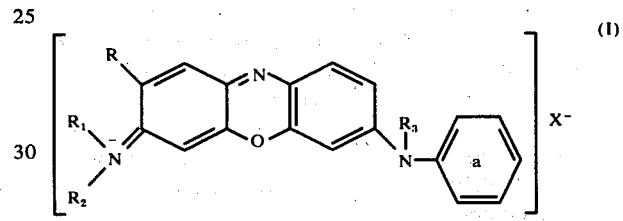
(I)

in which R is hydrogen or lower alkyl, $R_1$, $R_2$ and $R_3$ each is hydrogen or lower alkyl unsubstituted or substituted by halogen, lower alkoxy, cyano or hydroxy, and $R_1$ and $R_2$ may form together with the nitrogen atom a heterocyclic ring selected from the group consisting of pyrrolidino, piperidino, morpholino, piperazino, and $X^-$ stands for an anion and the benzene nucleus $a$ is unsubstituted or substituted by halogen, lower alkoxy, aryloxy, lower alkyl, trifluoromethyl, nitro, lower alkylsulfonyl, arylsulfonyl, arylamino, cyano, acyl, mono-lower alkylamino or di-lower alkyl amino, which process comprises reacting, in an acid medium, a. a compound of the formula II

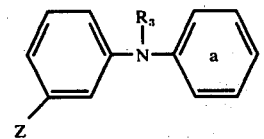
(II)

in which $R_3$ and $a$ are defined as above and Z is lower alkoxy or dialkylamino, with a compound of the formula III

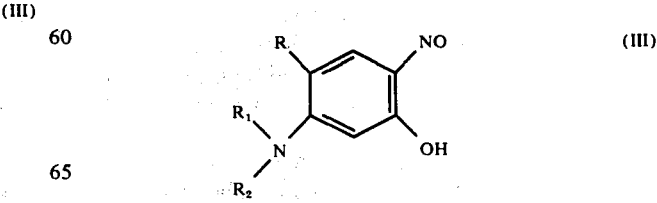
(III)

in which R, $R_1$ and $R_2$ are defined as above, or b. a compound of the formula IV

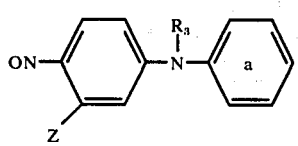

in which $R_3$, Z and a are defined as above, with a compound of the formula V

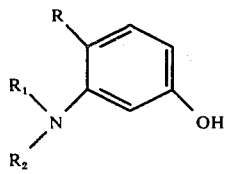

in which R, $R_1$ and $R_2$ are defined as above; or 2. more specifically the invention relates to a process as just recited in (1) above wherein the benzene nucleus a of the prepared dyestuffs of the formula I and the starting compounds of formula II or IV used may be substituted by lower alkyl, lower alkoxy, acetyl, cyano, halogen, phenoxy or trifluoromethyl.

The terms "lower alkyl" or "lower alkoxy" hereintofore and hereinafter given are meant to stand for groups which have alkyl radicals of 1 to 5 carbon atoms per alkyl chain.

As compounds of the formula II there are mentioned 3-alkoxy-diphenyl amines or 3-dialkylamino-diphenyl amines which may be substituted at the nitrogen atom of the diphenyl amine optionally by lower alkyl groups $R_3$ and which may contain in the benzene nucleus a optionally non ionic substituents, such as halogen atoms, lower alkoxy, aryloxy, lower alkyl, trifluoromethyl, nitro, lower alkylsulfonyl, arylsulfonyl, lower mono- or dialkylamino, arylamino, cyano or acyl groups.

As compounds of the formula III there are mentioned 4-nitroso-3-hydroxy-anilines wherein the attached amino group of the formula $-NR_1R_2$ may be primary or secondary, for example a lower mono- or dialkylamino group, the lower alkyl radicals of which may contain further substituents, such as halogen atoms, hydroxy, lower alkoxy or cyano groups. Compounds of the formula III alkylated in 6 position are also suitable according to the invention.

As compounds of the formula IV there are mentioned 4-nitroso-3-alkoxy- or 4-nitroso-3-dialkylamino-diphenyl amines which may be substituted at the nitrogen atom of the diphenyl amine optionally by lower alkyl groups $R_3$ and which may contain in the benzene nucleus a optionally non ionic substituents, such as halogen atoms, lower alkoxy, aryloxy, lower alkyl, trifluoromethyl, nitro, lower alkylsulfonyl, arylsulfonyl, lower mono- or dialkylamino, arylamino, cyano or acyl groups.

As compounds of the formula V there are mentioned m-amino-phenols or m-amino-p-alkyl-phenols, wherein the amino group may be substituted by one or two lower alkyl groups which may optionally contain further substituents, such as halogen atoms, hydroxy, lower alkoxy or cyano groups.

Condensation of the starting compounds according to the embodiment (a) or (b) is performed at temperatures between about 20° and 120° C, preferably between about 60° and 100° C, in an acid medium. It is suitable to use the hydrohalides, preferably the hydrochlorides of the p-nitroso compounds.

The dyestuffs obtainable according to the invention contain as anion $X^-$ the radical of a strong acid, preferably sulfuric acid or hydrochloric acid, or a chlorozincate anion. These anions introduced according to the invention may also be replaced by anions of other acids, for example phosphoric acid, acetic acid, oxalic acid, benene-sulfonic acid, toluene-sulfonic acid, amino-sulfonic acid, nitric acid, carbonic acid, lactic acid or tartaric acid.

The dyestuffs are suitable for the dyeing or printing of tanned cellulose fibers, silk, leather or fully synthetic fibers, such as acetate rayon, polyamide fibers or acid-modified polyester or polyamide fibers, especially fibers containing polyacrylonitrile or polyvinylidene cyanide. The dyeings produced on these fibers are mostly very bright and color-intensive and generally have good fastness properties to light and wet processing, for example good fastness to washing, fulling, cross-dyeing, carbonizing, chlorine treatment and perspiration, as well as a good fastness to decatizing, steaming, ironing, rubbing and solvents. Generally, the dyestuffs are mostly not sensitive to the change in the pH-value of the dyebath and may therefore as well be used in a weakly acid as in a strongly acid bath. Moreover, they are stable at temperatures above 100° C, as applied in the high temperature dyeing.

Dyeing is generally performed in an aqueous medium at or below the boiling temperature or in closed vessels at temperatures above 100° C under pressure. The dyestuffs may also be used in organic solvents, for example chlorinated hydrocarbons.

Compared to the process known from Belgian Pat. No. 661,783 the process of the present invention is distinguished by the fact that the nitroso compound has not to be used in an excess (at least 50%) but the nitroso compound and the m-amino-phenol are used in equimolar amounts. Moreover, the by-products formed according to the process of the invention, such as alcohols or secondary amines, are easily soluble whereas the by-product obtained by the known process is p-amino-diphenyl amine which has to be separated at high costs.

The following Examples serve to illustrate the invention, the parts and percentages being by weight unless stated otherwise.

EXAMPLE 1

A solution of 10 parts of 3-methoxy-diphenyl amine in 100 parts by volume of alcohol was heated on a steam bath. Subsequently, 11.5 parts of 4-nitroso-3-hydroxy-N,N-diethylaniline hydrochloride were added in small portions while the alcohol was slightly boiling. Heating was continued to boiling temperature until a sample dotted on filter paper showed by its purely blue shade that the nitroso compound had reacted. The alcohol was then separated by distillation, the residue was dissolved in 400 parts of hot water and filtered. By adding zinc chloride and sodium chloride the dyestuff of the formula

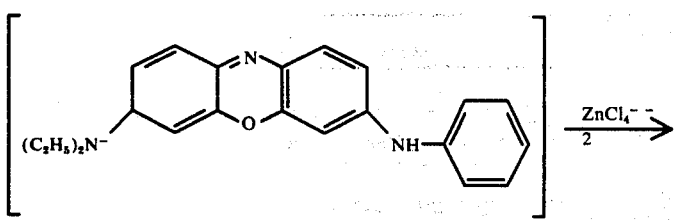

was precipitated from the filtrate in the form of a dark powder which dissolved in water and dilute acids to give a blue solution.

1 Gram of the dyestuff was stirred with 2.5 g of 50% acetic acid and the mixture was dissolved in 6 liters of water. 1 Gram of crystallized sodium acetate and 10 g of calcined sodium sulfate were added to the dyebath. Subsequently, 100 g of preliminarily washed yarn made from polyacrylonitrile staple fibers were introduced into the dyebath at 60° C, the temperature was slowly raised to 100° C and dyeing was performed for 1 hour at boiling temperature. The dyed material was then slowly cooled to about 60° C, rinsed and dried. A bright greenish blue dyeing having a very good fastness to light and wet processing was obtained.

EXAMPLE 2

A mixture of 7.5 parts of 3-dimethylamino-4-methyl-phenol, 11.4 parts of 3-methoxy-4-nitroso-diphenyl amine, 10 parts by volume of 5N hydrochloric acid and 100 parts by volume of alcohol was kept boiling on a steam bath until a sample dotted on filter paper indicated the consumption of the nitroso compound. The alcohol was then separated by distillation, the residue was taken up in 500 parts by volume of hot water and the solution was filtered. By adding sodium chloride the dyestuff of the formula

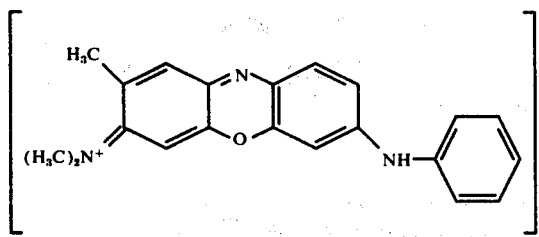

was precipitated from the filtrate as a dark powder which dissolved in water and dilute acids to give a blue solution.

1 Gram of the dyestuff was stirred with 2 g of 50% acetic acid and the mixture was dissolved in 5 liters of water containing 1 g of crystallized sodium acetate. Subsequently, 100 g of pre-washed material made from acid-modified polyester fibers were introduced into the dyebath at 60° C, the temperature was slowly raised and dyeing was performed for 1 hour at 115° to 120° C. The goods were then cooled to about 70° C, rinsed and dried. A bright greenish blue dyeing having a good fastness to light and wet processing was obtained.

EXAMPLE 3

A mixture of 6.2 parts of 3-amino-4-methyl-phenol, 12 parts of 3-methoxy-4-nitroso-diphenyl amine, 100 parts by volume of ethyl alcohol and 2 parts of 30% hydrochloric acid was heated at the boil and refluxed for 2 hours.

The substance was then cooled to 5° C and the crystallized dyestuff of the formula

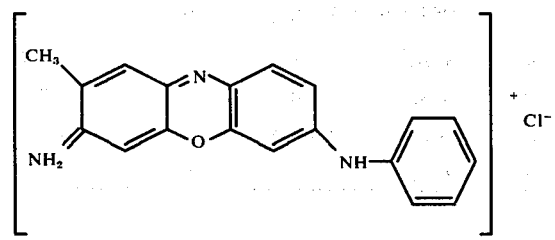

was suction-filtered. It was a dark powder which dissolved in water and dilute acids to give a blue solution.

The color base was precipitated by means of dilute sodium hydroxide solution from an aqueous solution of 10 parts of the dyestuff. The suction-filtered moist color base was added while stirring to a mixture of 20 parts by volume of glacial acetic acid and 10 parts by volume of diethylene-glycol mono-butyl ether and the mixture was heated to 60°–70° C for about 45 minutes. A concentrated dyestuff solution was obtained which remained stable even at −10° C and which is suitable for the preparation of dyebaths or printing pastes.

The following Table contains further dyestuffs which have been prepared according to the novel process disclosed herein as well as the shades of the dyeings obtainable with the dyestuff on polyacrylonitrile fibers.

TABLE

| R | $R_1$ | $R_2$ | $R_3$ | Substituent in the benzene radical a | $X^-$ | Shade |
|---|---|---|---|---|---|---|
| H | $CH_3$ | $CH_3$ | H | — | $Cl^-$ | greenish blue |
| H | $CH_3$ | $C_2H_5$ | H | — | $Cl^-$ | greenish blue |
| $CH_3$ | $CH_3$ | $C_2H_5$ | H | — | $\frac{ZnCl_4^{--}}{2}$ | greenish blue |
| $C_2H_5$ | $CH_3$ | $CH_3$ | H | — | $\frac{ZnCl_4^{--}}{2}$ | greenish blue |

TABLE-continued

| R | $R_1$ | $R_2$ | $R_3$ | Substituent in the benzene radical a | $X^-$ | Shade |
|---|---|---|---|---|---|---|
| $CH_3$ | $C_2H_5$ | $C_2H_5$ | H | — | $\frac{ZnCl_4^{--}}{2}$ | greenish blue |
| H | H | H | H | — | $\frac{ZnCl_4^{--}}{2}$ | greenish blue |
| $CH_3$ | H | $C_2H_5$ | $CH_3$ | — | $Cl^-$ | greenish blue |
| $CH_3$ | $C_2H_4OH$ | $C_2H_4OH$ | H | — | $Cl^-$ | greenish blue |
| H | $C_2H_4Cl$ | $C_2H_4Cl$ | $C_2H_5$ | — | $Cl^-$ | greenish blue |
| H | $CH_3$ | $CH_3$ | $C_2H_4OH$ | — | $Cl^-$ | greenish blue |
| H | $C_2H_5$ | $C_2H_5$ | H | $4\text{-}CH_3O$ | $\frac{ZnCl_4^{--}}{2}$ | greenish blue |
| H | $C_2H_5$ | $C_2H_5$ | H | $2,5\text{-}(CH_3)_2$ | $\frac{ZnCl_4^{--}}{2}$ | greenish blue |
| H | $C_2H_5$ | $C_2H_5$ | H | $4\text{-}Cl$ | $\frac{ZnCl_4^{--}}{2}$ | greenish blue |
| H | $C_2H_5$ | $C_2H_5$ | H | $3,4\text{-}Cl_2$ | $\frac{ZnCl_4^{--}}{2}$ | greenish blue |
| H | $R_1 + R_2$: $-CH_2CH_2CH_2CH_2CH_2-$ | | H | — | $\frac{ZnCl_4^{--}}{2}$ | greenish blue |
| H | $-CH_2CH_2OCH_2CH_2-$ | | H | — | $\frac{ZnCl_4^{--}}{2}$ | greenish blue |
| H | $C_2H_5$ | $C_2H_5$ | H | $4\text{-}C_2H_5O$ | $Cl^-$ | greenish blue |
| $CH_3$ | $CH_3$ | $CH_3$ | $CH_3$ | $4\text{-}CH_3$ | $Cl^-$ | greenish blue |
| $C_2H_5$ | $C_2H_4OH$ | $C_2H_4OH$ | H | $4\text{-}Cl$ | $Cl^-$ | greenish blue |
| $CH_3$ | $C_2H_5$ | H | H | — | $Cl^-$ | greenish blue |

We claim:
1. A basic oxazine dyestuff of the formula I

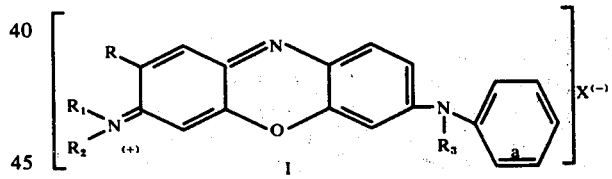

in which R is hydrogen or lower alkyl, $R_1$ is hydrogen or lower alkyl substituted by halogen, lower alkoxy, cyano or hydroxy, $R_2$ and $R_3$ each is hydrogen or lower alkyl or lower alkyl substituted by halogen, lower alkoxy, cyano or hydroxy, or $R_1$ and $R_2$ form together with the nitrogen atom the pyrrolidino, piperazino, piperidino or morpholino ring, and the phenyl nucleus a is substituted by lower alkyl, lower alkoxy, acetyl, cyano, halogen, phenoxy or trifluoromethyl, and $X^{(-)}$ is an anion.

* * * * *